Oct. 4, 1960 W. P. MASON 2,955,267

ELECTROMECHANICAL TORSIONAL BAND PASS WAVE FILTER

Filed Aug. 20, 1958 4 Sheets-Sheet 1

INVENTOR
W. P. MASON
BY
H. O. Wright
ATTORNEY

ELECTROMECHANICAL TORSIONAL BAND PASS WAVE FILTER

INVENTOR
W. P. MASON
BY
H. O. Wright
ATTORNEY

Oct. 4, 1960 W. P. MASON 2,955,267

ELECTROMECHANICAL TORSIONAL BAND PASS WAVE FILTER

Filed Aug. 20, 1958 4 Sheets-Sheet 3

INVENTOR
W. P. MASON
BY
H. O. Wright
ATTORNEY

Oct. 4, 1960 W. P. MASON 2,955,267

ELECTROMECHANICAL TORSIONAL BAND PASS WAVE FILTER

Filed Aug. 20, 1958 4 Sheets-Sheet 4

INVENTOR
W. P. MASON
BY
H. O. Wright
ATTORNEY

United States Patent Office 2,955,267

Patented Oct. 4, 1960

2,955,267

ELECTROMECHANICAL TORSIONAL BAND PASS WAVE FILTER

Warren P. Mason, West Orange, N.J., assignor to Bell Telephone Laboratories, Incorporated, New York, N.Y., a corporation of New York Filed Aug. 20, 1958, Ser. No. 756,181

7 Claims. (Cl. 333—71)

This invention relates to electromechanical wave filters. More particularly, it relates to electromechanical wave filters employing a plurality of torsionally vibrating elements.

Prior art electromechanical wave filters of the above type have universally, insofar as applicant is aware, employed coupling members between successive torsionally vibrating elements which are short (i.e. usually less than one-quarter wavelength long of the median operating frequency). Such wave filters have relatively low attenuation in the frequency regions adjacent the pass-band and consequently require a large number of torsionally vibrating elements to provide sufficient discrimination between adjacent channels for the majority of communication systems throughout the frequency regions in which such filters can be employed.

Accordingly, it is a principal object of the invention to reduce the number of elements required to obtain a predetermined discrimination between adjacent communication frequency bands in electromechanical wave filters using torsionally vibrating elements.

Another object is to simplify and reduce the cost of electromechanical wave filters which use torsionally vibrating elements.

The present invention achieves these and other objects by coupling the successive torsionally vibrating elements of such filters by members which are substantially longer than those heretofore employed in such structures. The present invention also discloses a simple, convenient way in which to provide peaks of attenuation in the attenuating frequency regions of the filters of the invention.

Other objects, features and advantages of the invention will become apparent from the attached claims and during the course of the following detailed description of specific illustrative embodiments of the invention as shown in the accompanying drawings, in which:

Figure 11:
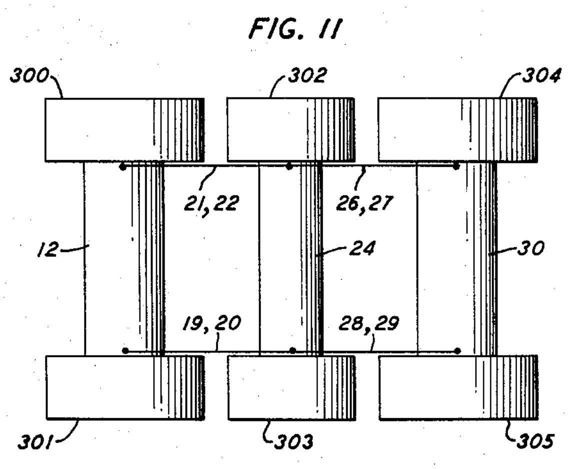
Figure 12:
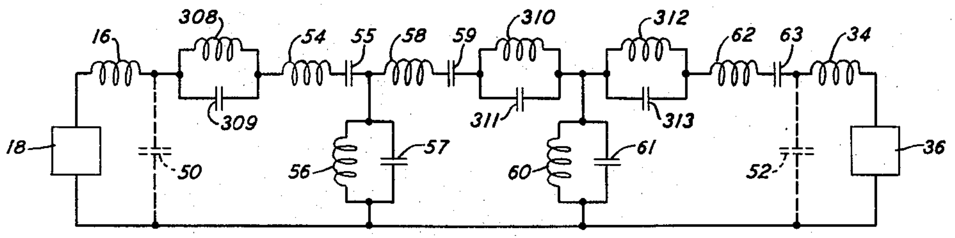

Fig. 11 represents the mechanical features of a further filter structure of the invention in which extensions are added to the transducers as well as to the resonator of the filter to provide additional attenuation peaks at frequencies adjacent to the pass-band of the filter; and Fig. 12 is an electrical schematic diagram including in schematic form the electrical circuits simulated by the mechanical structure of Fig. 11.

Figure 1:
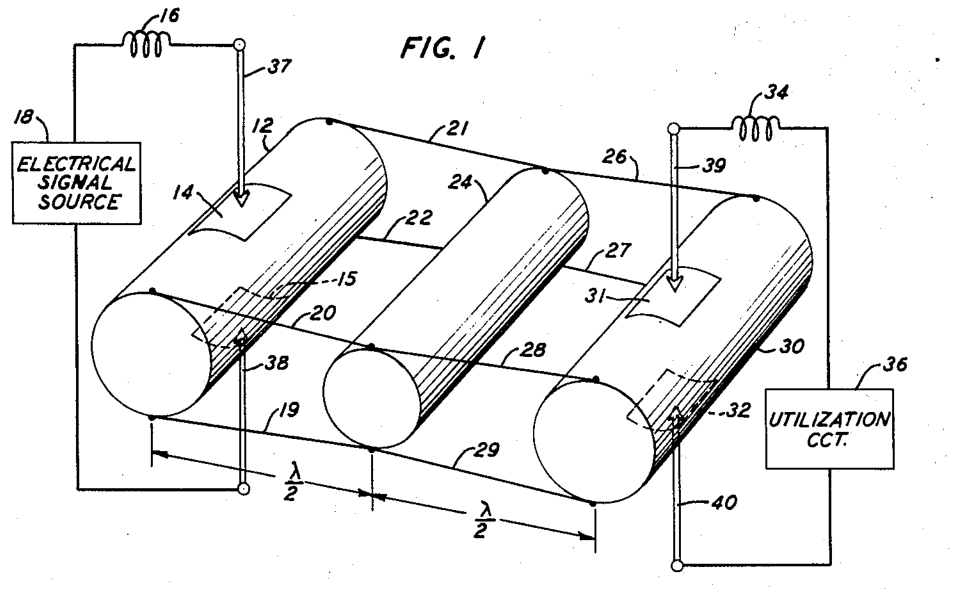
Fig. 1 is a partially diagrammatic representation of a first specific illustrative embodiment of the invention.

In more detail, in Fig. 1 a simple electromechanical filter illustrative of the invention is shown and comprises two cylindrical transducers 12 and 30, respectively, and a cylindrical resonator 24, the resonator 24 being mechanically connected to transducer 12 by the four wires 19 through 22 and to transducer 30 by the four wires 26 through 29, as shown.

The three cylindrical members are arranged with their longitudinal axes mutually parallel and are of substantially equal lengths, the front ends of the three members lying substantially in a first common plane normal to the longitudinal axes and the rear ends lying substantially in a second common plane likewise normal to the longitudinal axes.

Wires 19, 20, 28 and 29 are connected tangentially to their respective associated cylinders, as illustrated, and lie substantially in the first common plane. Wires 21, 22, 26 and 27 are likewise connected tangentially to their respective associated cylinders, as illustrated, and lie substantially in the second common plane.

Figure 2:
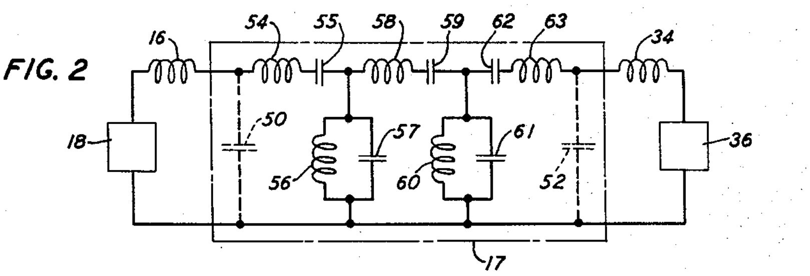
Fig. 2 is an electrical schematic diagram including in schematic form the electrical circuit simulated by the mechanical portions of the structure illustrated in Fig. 1.

Transducers 12 and 30 can be, for example, of polarized barium titanate and of the type described in detail in my Patent 2,742,614 granted April 17, 1956 and illustrated in Fig. 2 of the patent. If a high degree of stability with temperature variations is desired, minor percentages of lead and calcium titanates may be added to the barium titanate as taught in my copending application, Serial No. 351,843, filed April 29, 1953, which matured into Patent 2,906,973, granted September 29, 1959, and the cylinders may also be pre-aged as taught in my copending divisional application, Serial No. 733,679, filed May 7, 1958. Transducer 12 has oppositely disposed conductive electrodes 14 and 15 symmetrically arranged with respect to a plane which includes the centers of all three cylindrical members and is normal to their longitudinal axes. Likewise, transducer 30 is provided with corresponding electrodes 31 and 32, as shown.

The filter structures of the invention including that of Fig. 1 are band pass structures, that is they each freely pass all frequencies within a predetermined range or band of frequencies and in general attenuate substantially all frequencies sufficiently proximate to be of interest but which are not included within the predetermined pass-band.

Transducers 12 and 30 and resonator 24 are made one-half wavelength long of the median frequency of the predetermined pass-band of the filter. Since the transducer cylinders are usually of a different material than the cylinders employed solely as resonators, the resonators being usually, for example, of brass, ceramic, glass or steel, corresponding dimensions (i.e. diameter and length) of the resonators will normally be slightly less than for the barium titanate transducer cylinders. The two types of cylinders, however, for the illustrative structures described in the present application, can be considered as being of substantially the same dimensions and the differences normally required will not be so large as to produce any major problems in constructing the filters.

Upon the application, for example, of an electrical signal wave, such as that from a source 18, of a frequency within or adjacent to the predetermined pass-band to the electrodes 14, 15 of transducer 12, it will vibrate in the torsional mode about a central bisecting plane as a "nodal" plane, that is a plane of no motion. Accordingly, it can be mechanically supported by rigid supports 37 and 38 in the central plane and the supports can also serve as the electrical connecting members to electrodes 14 and 15, respectively, as indicated in Fig. 1. An inductance 16 is added in series with the transducer 12 to increase its "bandwidth" of response in accordance with principles disclosed and explained, for example, in my Patent 2,045,991, granted June 30, 1936, in connection with Figs. 7 and 9 of the drawings of the patent.

Similarly, transducer 30 when subjected to a torsional mode of vibration about its central plane as a nodal plane will generate corresponding electrical signal voltages across its electrodes 31, 32 and it also can be mechanically supported by centrally located rigid members 39 and 40 which also can serve as electrical connections to electrodes 31 and 32 of that transducer. An inductance 34 is included in series with transducer 30 to increase its bandwidth as described above for transducer 12. Torsional vibrations of transducer 12, if of frequencies within the predetermined pass-band of the filter, will be freely transmitted by the four wires 19 through 22 to establish corresponding torsional vibrations of resonator 24 and from resonator 24 by the four wires 26 through 29 to transducer 30. Transducer 30, as described above, will generate electrical energy corresponding to the torsional vibrations. An appropriate utilization circuit 36 is electrically connected across the series combination of inductance 34 and electrodes 31, 32 of transducer 30, as shown. Wires 19 through 22 and 26 through 29, inclusive, should be sufficiently stiff and should be under sufficient tension that only longitudinal vibration is transmitted by them. These wires obviously can be tensed to a suitable degree by appropriately separating the input and output transducers. Any tendency toward flexural vibration of these wires can be further reduced by enclosing them in sleeves of damping material, or by plating them with a material such as lead which has a high damping. This will damp the flexural modes much more than the longitudinal modes since they have many wavelengths as compared to half a wavelength for the longitudinal mode.

At frequencies above or below the transmission region or pass-band of the filter, the torsional vibrations of transducer 12 will be very substantially reduced in passing to the resonator and thence to the transducer 30, so that for frequencies at any appreciable frequency interval from the pass-band little if any energy will be transmitted through the filter.

The frequency characteristics of the filter of Fig. 1 will be more readily apparent from a detailed consideration of the electrical schematic diagram of Fig. 2. This diagram represents an equivalent electrical circuit of the over-all filter, including a portion enclosed by broken line 17 which indicates the equivalent electrical circuit portions simulated by the active or vibrating mechanical portions of the structure of Fig. 1, described above.

In Fig. 2, the electrical signal source 18 is connected through an electrical inductance 16 to the input transducer (12 of Fig. 1) represented in Fig. 2 by capacitor 50 (shown by broken lines) together with the series combination of inductance 54 and capacitor 55. Capacitor 50 is the interelectrode electrical capacity of the transducer, inductance 54 is the electrical equivalent of the inertia of the mass of the transducer, and capacitor 55 is the electrical equivalent of the stiffness or compliance of the transducer in the torsional vibrational mode. Since the transducer is one-half wavelength long at the median frequency of the pass-band and vibrates as stated above about a nodal plane bisecting it, it is the mechanical equivalent of a short-circuited quarter wavelength electrical transmission line, and within the frequency range of interest, which is of course substantially centered about the median frequency of the pass-band of the filter, it can be represented quite accurately by the series combination of inductance 54 and capacitor 55. These elements, of course, are resonant at the mid-frequency of the pass-band.

The four wires 19 through 22, inclusive, connecting transducer 12 to resonator 24 are made one-half wavelength long of the median frequency of the pass-band and are the mechanical equivalent of a half wavelength transmission line which within the frequency range of interest can be represented quite accurately by the parallel combination of inductance 56 and capacitor 57 connected in shunt relation, as indicated, the combination being parallel-resonant, that is, anti-resonant, at the mid-frequency of the pass-band.

In similar manner, the series combination of inductance 58 and capacitor 59 represents the electrical equivalent of resonator 24, the parallel combination of inductance 60 and capacitor 61 represents the electrical equivalent of wires 26 through 29, inclusive (wires 26 through 29 are also made one-half wavelength long) and the series combination of inductance 63 and capacitor 62 represents the electrical equivalent of the transducer 30. Capacitor 52 (shown in broken line) is, of course, the electrical capacitance between the electrodes 31, 32 of transducer 30 and inductance 34 is an electrical inductance inserted, as described above, in series with the transducer 30 to increase the bandwidth of the response of the transducer. Utilization circuit 36 receives and utilizes the electrical signals generated by transducer 30 in response to torsional vibrations reaching it.

It will be immediately apparent to those skilled in the art of electrical wave filters that a filter having series resonant arms alternating with shunt parallel resonant arms, all resonant at the mid-band frequency, as formed by elements 54 through 63, inclusive, is a "confluent" band pass wave filter. (See "Transmission Networks and Wave Filters," by T. E. Shea, page 233, published by D. Van Nostrand Co., New York 1929, and Patent 1,227,113, granted May 22, 1917, to G. A. Campbell, page 3, line 92 through page 4, line 3, and page 4, lines 94 through 99.)

Such a filter, as is well known to those skilled in the art, has more than twice as much attenuation throughout its attenuating regions per filter section as prior art mechanical filters in which the coupling wires are much less than one-half wavelength long of the mid-band frequency of the filter. The shorter wires are, of course, electrically represented by a simple capacitor. Accordingly, filters of the present invention require less than half the number of elements of a corresponding prior art filter of the same general type. In addition, the use of cylindrical transducers in this type of filter as taught in the present application further reduces the number of cylinders required as simple resonators.

Figure 3:
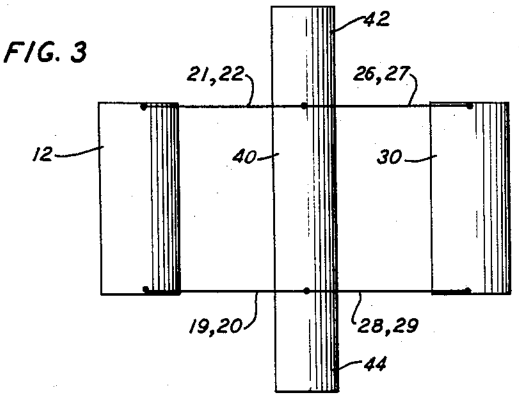
Fig. 3 represents a modification of the structure of Fig. 1 to obtain a peak of attenuation adjacent to the transmitting band of the band pass filter.

In Fig. 3 a "cylinder and wire assembly" constituting the active mechanical portions of another filter of the invention is shown and is identical with the corresponding portions of the filter of Fig. 1, as indicated by the use of corresponding designation numbers, except that the resonator 24 of Fig. 1 has been replaced by resonator 40 of Fig. 3. The mechanical supports and the electrodes on transducers 12 and 30 and the electrical connections to the source 18 and utilization circuit 36 are not shown in Figs. 3, 4, 6, 10 and 11, to simplify the drawings, but are to be understood as being necessary to complete an operative embodiment in the manner shown in Fig. 1.

Resonator 40 of Fig. 3 differs from resonator 24 of Fig. 1 in that its ends have been extended beyond the points of attachment of the wires 19, 20, 28 and 29 and wires 21, 22, 26 and 27, to form equal projections 42 and 44 having the same diameter as the central portion as shown. Sections 42 and 44 obviously are driven torsionally by the wires exactly as is the central portion. As their outer ends are free they can be considered to be equivalent to a section of transmission line terminating in an open circuit.

Figure 5:
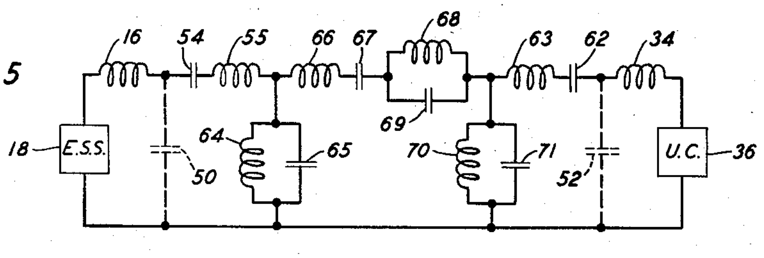
Fig. 5 is an electrical schematic diagram including in schematic form the electrical circuit simulated by the mechanical structures of Figs. 3 and 4.

Referring to Fig. 5, which is the schematic diagram of an equivalent all-electrical filter circuit for the filter of Fig. 3 taken with the electrical circuit portions of Fig. 1, it is found that it differs from the circuit of Fig. 2 for the filter of Fig. 1 only in that the resonator 40 with extensions 42 and 44 is represented by the four-element combination of inductance 66 in series with capacitor 67 and inductance 68 in parallel with capacitor 69, the paralleled elements 68, 69 being in series with the first mentioned two elements. It is at once apparent to one skilled in the art of electrical wave filters from inspection of Fig. 5 that the addition of the parallel combination of inductance 68 and capacitor 69 in a series arm of the schematic circuit will produce a peak of attenuation at the frequency at which the parallel combination is resonant (commonly also referred to as "anti-resonant" for such a parallel combination). This peak of attenuation obviously can be made to occur either below or above the pass-band of the filter by simply making the length of extensions 42 and 44 one-quarter wavelength long of the frequency at which the attenuation peak is to occur. As is also entirely familiar to those skilled in the art, filter sections producing attenuation peaks are commonly employed to increase the steepness with which the attenuation of the filter characteristic rises at the edges, i.e. just beyond the limits (below the lower cut-off or above the upper cut-off), of the transmitted region or pass-band and to increase the attenuation at frequencies relatively close to the pass-band.

Figure 4:
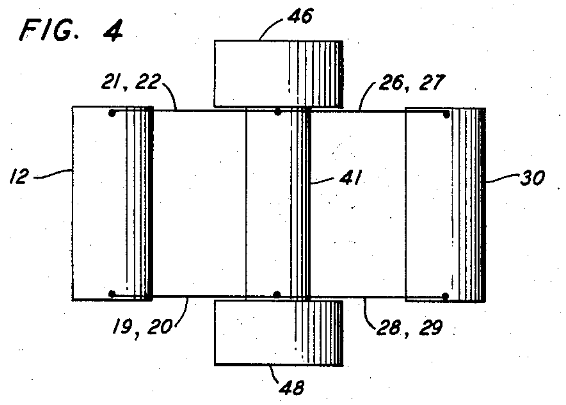
Fig. 4 represents an alternative modification of the structure of Fig. 1 to obtain a result similar to that obtained by the structure of Fig. 3.

In Fig. 4 a second "cylinder and wire assembly" constituting the active mechanical portions of an alternative form of filter equivalent to that represented in part by the corresponding portions of Fig. 3 is shown. These differ from those shown in Fig. 3 only in that the extensions 46 and 48 of the resonator 41 are of larger diameter than the central portion. Accordingly, to resonate at a specific frequency and thus produce a peak of attenuation at the specific frequency, they can be shorter (along the longitudinal axis of member 41) than are members 42 and 44 of Fig. 3. It will be apparent to those skilled in the art that the structure of Fig. 4 taken with the electrical circuit portions of Fig. 1 is also accurately represented by the schematic circuit of Fig. 5.

Figure 6:
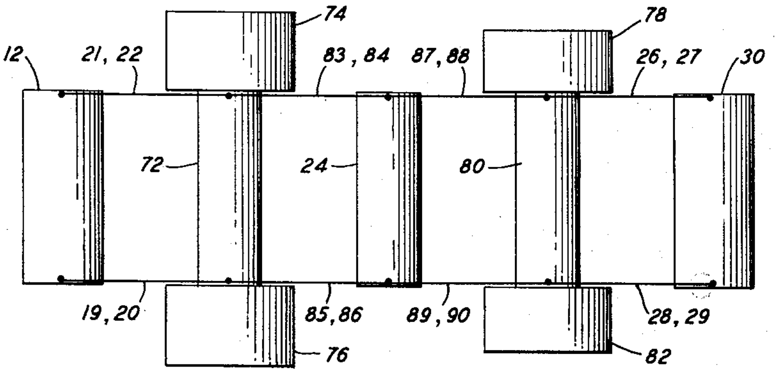
Fig. 6 represents the mechanical features of a structure of the invention employing a plurality of resonating cylinders between input and output electromechanical transducers.

To illustrate the extreme flexibility with which the principles of the present invention are applicable in a straightforward manner to the design of more complex electromechanical filters, a third "cylinder and wire assembly" constituting the active mechanical portions of a more complex filter of the invention is indicated in Fig. 6.

In Fig. 6 three resonators 72, 24 and 80 are included between transducers 12 and 30. Transducer 12 is connected to resonator 72 by wires 19 through 22, inclusive. Resonator 72 is connected to resonator 24 by wires 83 through 86, inclusive. Resonator 24 is connected to resonator 80 by wires 87 through 90, inclusive. Resonator 80 is connected to transducer 30 by wires 26 through 29, inclusive. In general, all sets of four wires interconnecting successive cylinders may be made one-half wavelength of the mid-frequency of the pass-band in length, though minor irregularities may appear in the pass-band where "peak" producing sections are employed. In such cases a small adjustment in the length of the wires connecting to the cylinder producing the attenuation peak will eliminate the irregularity. As a general rule, where the attenuation peak is below the pass-band the wires connecting to the cylinder producing the peak should be slightly shorter and where the attenuation peak is above the pass-band they should be slightly longer. The principle involved is the same as is disclosed and explained by R. A. Sykes, in his Patent 2,332,120, granted October 19, 1943, in connection with a rod and bar type of filter employing longitudinal vibrating energy.

Resonators 72 and 80 are each provided with two extensions 74, 76 and 78, 82, respectively, as shown and thus can each provide an attenuation peak in the transmission characteristic of the filter. As may be desired for any specific design, by appropriate adjustment of the lengths of the projections as described hereinabove, both attenuation peaks can be made to occur below the cut-off frequency or above the upper cut-off frequency of the pass-band of the filter. Alternatively, one attenuation peak can be placed below the lower cut-off frequency and the other above the upper cut-off frequency. The advantages of such flexibility are, of course, immediately apparent to those skilled in the art.

Figure 7:
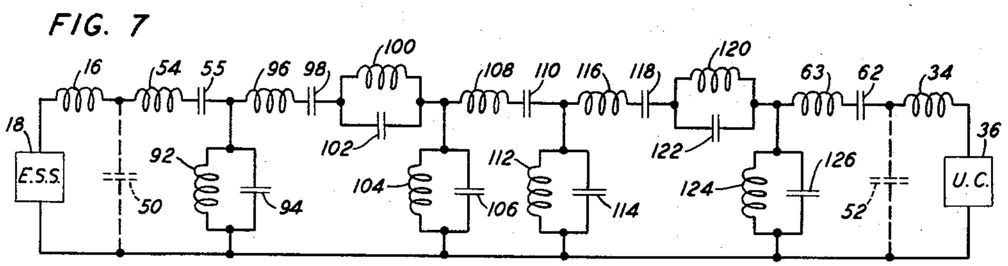
Fig. 7 is an electrical schematic diagram including in schematic form the electrical circuit simulated by the mechanical structure of Fig. 6.

The equivalent electrical schematic circuit of the structure of Fig. 6, taken with the electrical circuit portions of Fig. 1, is shown in Fig. 7 where the four-element series arm comprising elements 96, 98, 100 and 102 can represent resonator 72 with its projections 74 and 76. Likewise, the four-element series arm comprising elements 116, 118, 120 and 122 can represent resonator 80 with its projections 78 and 82. The four sets of four connecting wires are, of course, represented from left to right in the following way. Wires 19 through 22 are represented by the shunt arm parallel resonant combination of elements 92 and 94. Wires 83 through 86 are represented by the shunt arm parallel resonant combination of elements 104 and 106. Wires 87 through 90 are represented by the shunt arm parallel resonant combination of elements 112 and 114. Wires 26 through 29 are represented by the shunt arm parallel resonant combination of elements 124 and 126.

Figure 8:
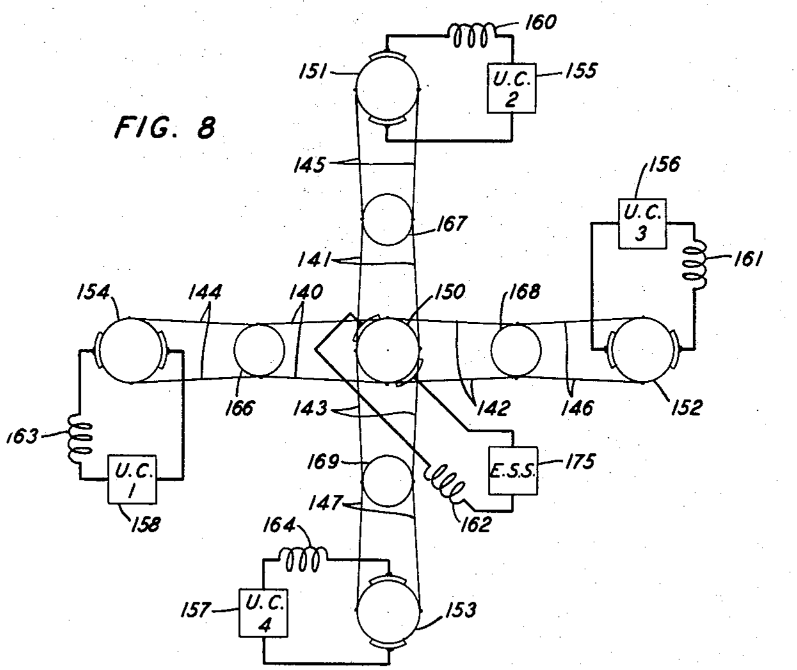
Fig. 8 represents an arrangement of the invention comprising four filters of the invention utilizing a common input transducer.

In Fig. 8 a composite arrangement of filters of the invention is illustrated in diagrammatic form, in which a common input transducer 150 serves four filters having the four output transducers 151 through 154, respectively.

The four filters can be, by way of a simplified example, of the type illustrated in Fig. 1. Each filter will be designed to pass a different band of frequencies, the bands being spaced as closely together as can be done conveniently, bearing in mind that filters having adjacent bands must provide sufficient attenuation or discrimination to frequencies within the adjacent bands that objectionable interference from frequencies of the adjacent bands will not be encountered in the pass-band of any filter. Resonators 166 through 169, inclusive, and output transducers 151 through 154, inclusive, will be resonant, of course, at the mid-frequencies of their respective pass-bands, and the connecting wires 140 through 147, inclusive, for the filters correspondingly will be one-half wavelength long of the mid-frequency of the pass-band of the respective filter in which they are employed.

The common transducer 150 in such an arrangement will be designed to pass all four bands and will be resonant at the mid-frequency of the frequency range covered by all four transmission bands. Filters of the invention are conveniently designed to operate within the frequency range of from 50 to 500 kilocycles, inclusive, and can accommodate pass-bands as large as twenty percent of the mid-frequency of the pass-band.

Accordingly, for example, electrical signal source 175 can supply four voice-frequency bands each 3,000 cycles wide, the mid-frequency with respect to all four bands being, for example, 100 kilocycles, intervals of 500 to 1,000 cycles being left unused between adjacent bands to permit the attenuation of each filter to reach a sufficiently large value at the closest frequencies being transmitted through adjacent bands. The filters each will select a different one only of the four bands and transmit the selected band to its associated utilization circuit. Thus the four frequency bands will be segregated, a different one being directed to each of the utilization circuits 155 through 158, inclusive, respectively. Inductances 160 through 164, inclusive, are placed in series with the five transducers, respectively, as shown in Fig. 8, to appropriately broaden the response of their respective associated transducers.

Figure 9:
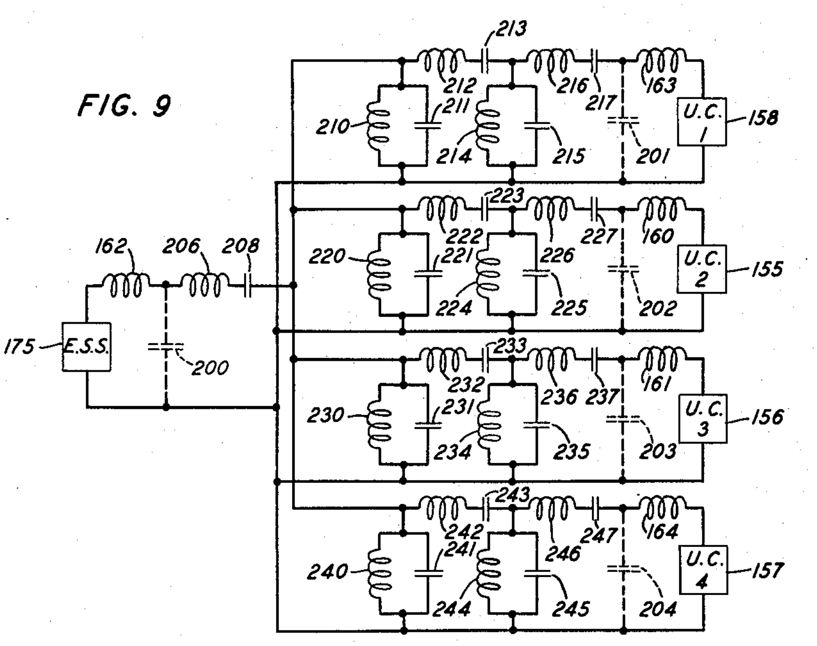
Fig. 9 is an electrical schematic diagram including in schematic form the electrical circuits simulated by the mechanical portions of the structure of Fig. 8.

In Fig. 9, an electrical schematic diagram of the arrangement illustrated in Fig. 8 is shown. The signal source 175 is connected via series inductance 162 to transducer 150, represented in Fig. 9 by elements 200, 206 and 208.

Parallel coil and condenser combinations 210, 211; 220, 221; 230, 231 and 240, 241, respectively, represent the four sets 140 through 143, inclusive, of four wires each which connect the resonators 166 through 169, inclusive, respectively, as shown, to the common input transducer 150. The four series resonant coil and condenser combinations 212, 213; 222, 223; 232, 233 and 242, 243 represent the four resonators 166 through 169, respectively.

Similarly, parallel coil and condenser combinations 214, 215; 224, 225; 234, 235 and 244, 245 represent the four sets 144 through 147, inclusive, of four wires each which connect the above mentioned resonators to the four output transducers 151 through 154, inclusive, respectively, as shown. The output transducers, in turn, are represented by the four series inductance and capacitor combinations together with the appropriate "broken line" capacitor 216, 217, 201; 226, 227, 202; 236, 237, 203 and 246, 247, 204, respectively, as shown.

Figure 10:
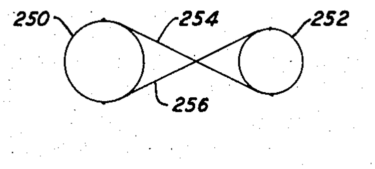
Fig. 10 is a diagram illustrating a simple way of obtaining a phase inversion in structures of the invention.

In Fig. 10 a first cylinder 250 is connected to a second cylinder 252 by wires 254 and 256 which are crossed to provide a phase shift of 180 degrees between the torsional vibrations of cylinders 250 and 252 when one cylinder is driven by torsional vibration of the other. Wires 254 and 256 should, of course, be spaced in the direction of the axes of the cylinders sufficiently that they do not make contact with each other. The arrangement of Fig. 10 constitutes a simple arrangement for obtaining a phase reversal in filters of the invention as is occasionally desirable for particular circuit designs.

In Fig. 11 a still further "cylinder and wire assembly" constituting the active mechanical portions of another filter of the invention is shown. In Fig. 11 the transducers 12 and 30 each carry two extensions 300, 301 and 304, 305, respectively, as shown. The resonator 24 likewise carries the two extensions 302 and 303.

In Fig. 12 the schematic diagram of the equivalent electrical circuit of a filter comprising the structure of Fig. 11 together with the electrical circuit portions as employed with the filter of Fig. 1 is shown. It differs from the diagram of Fig. 2 only in the addition of the parallel resonant combinations 308, 309; 310, 311 and 312, 313 in the series arms of the structure, respectively, as shown. As is immediately apparent to those skilled in the wave filter art, the filter illustrated by Figs. 11 and 12 can provide a peak of attenuation on either side of the pass-band for each of the parallel resonant combinations mentioned immediately above.

Numerous and varied other arrangements and modifications within the spirit and scope of the principles of the invention will readily occur to those skilled in the art. No attempt to exhaustively illustrate all such arrangements has here been made.

What is claimed is:

1. In an electromechanical band pass wave filter, the combination comprising a pair of parallel cylinders, and a pair of wires interconnecting each of the corresponding ends of the two cylinders tangentially, the cylinders and the wires each being substantially one-half wavelength of the mid-frequency of the pass-band of the filter in length, the cylinders being supported for balanced torsional vibration about their respective central transverse planes.

2. In an electromechanical band pass wave filter, a pair of cylinders spaced and aligned with their longitudinal axes parallel and with their corresponding ends in common planes, respectively, two wires in each of the common planes tangentially connecting upper and lower points on the ends of the cylinders respectively, the cylinders and the wires being one-half wavelength of the mid-frequency of the pass-band of the filter in length, and means supporting each cylinder for balanced torsional vibration about its central transverse plane.

3. An electromechanical band pass wave filter comprising a plurality of cylinders regularly spaced and aligned with their longitudinal axes parallel and with their corresponding ends in common planes respectively, each cylinder being connected to each cylinder adjacent to it by two wires at each end, the wires connecting tangentially to upper and lower points on the respective cylinder ends, the lengths of all of the cylinders and the wires being one-half wavelength of the mid-frequency of the pass-band of the filter, means for supporting each end cylinder for balanced torsional vibration about its central transverse plane and tensing the wires interconnecting adjacent cylinders to support the intermediate cylinders substantially in a common plane with the end cylinders, means for driving one end cylinder in balanced torsional vibration about its central transverse plane, and means for converting the balanced torsional vibration of the other end cylinder into electrical signals.

4. An electromechanical band pass wave filter comprising a first cylinder of barium titanate, said cylinder being polarized and provided with electrodes to respond by balanced torsional vibration about its median transverse plane when electrical signals are applied to said electrodes, means for rigidly supporting the cylinder for free balanced torsional vibration about its median transverse plane, a second like cylinder of barium titanate spaced from the first cylinder and also rigidly supported for free balanced torsional vibration about its median transverse plane, a third cylinder of resilient material supported between the first and second cylinders by tensed wires tangentially connecting at the top and bottom of the ends of the cylinders to provide a set of four wires of equal length interconnecting each cylinder with cylinders adjacent to it, each cylinder and each set of four wires having a length equal to one-half wavelength of the mid-frequency of the pass-band of the filter.

5. An electromechanical band pass wave filter including a plurality of resilient cylinders having a length of at least one-half wavelength of the mid-frequency of the pass-band of the filter and aligned at substantially equal intervals with their central transverse planes lying in a common plane, a pair of wires on each side of the common plane tangentially interconnecting each cylinder with adjacent cylinders of the alignment, the wires being at a distance of one-quarter wavelength of the mid-frequency of the pass-band of the filter from the common plane and having a length of one-half wavelength of the mid-frequency of the pass-band of the filter, at least one of the cylinders having equal like projections beyond each plane of attachment of the interconnecting wires, the projections being resonant at a frequency adjacent to the pass-band of the filter, each cylinder being supported for balanced torsional vibration about its central transverse plane.

6. In an electromechanical torsional band pass wave filter a plurality of cylinders supported and adapted to vibrate torsionally in a balanced manner about their respective central transverse planes, said cylinders being aligned with their respective central transverse planes in a common plane and being interconnected in succession by pairs of longitudinal vibration transmitting coupling means, each pair being symmetrically arranged in a balanced manner with respect to the common plane of the central transverse planes for transmitting the torsional vibration energy of one cylinder to generate similar torsional vibration in the next successive cylinder, the coupling means and the cylinders all having a length of one-half wavelength of the mid-frequency of the pass-band of the filter, means responsive to electrical signals for generating balanced torsional vibrations about its central transverse plane in one end cylinder of the plurality, and means responsive to the balanced torsional vibrations of the other end cylinder of the plurality for generating corresponding electrical signals.

7. In an electromechanical band pass filter a plurality of resilient cylinders, each cylinder being symmetrical in size and contour with respect to its central transverse plane and having a length of at least one-half wavelength of the mid-frequency of the pass-band, said cylinders being aligned at regular intervals and adapted and supported for balanced torsional vibration about their respective central transverse planes, the central transverse planes of all the cylinders being in a common plane, longitudinal vibration transmitting means symmetrically arranged on each side of the common plane and coupling each cylinder to the next successive cylinder in the alignment, the coupling means within the frequency band passed by the filter transmitting energy to the next successive cylinder to establish balanced torsional vibration of the cylinder about its central transverse plane, the coupling means comprising a plurality of wires tangentially interconnecting to points on the surfaces of the successive cylinders which are at a distance of one-quarter wavelength of the mid-frequency of the pass-band from the respective central transverse planes of the cylinders, the wires having a length equal to one-half wavelength of the mid-frequency of the pass-band, several of the cylinders including at each end of the cylinder like portions extending beyond the points of attachment of the coupling wires, the extended portions of each cylinder being resonant at a frequency adjacent to the pass-band of the filter, the resonant frequencies of the extensions of the several cylinders being different for each cylinder.

References Cited in the file of this patent

UNITED STATES PATENTS

| | | |
|---|---|---|
| 1,933,306 | Berry et al. | Oct. 31, 1933 |
| 2,615,981 | Doelz | Oct. 28, 1952 |
| 2,717,361 | Doelz | Sept. 6, 1955 |
| 2,742,614 | Mason | Apr. 17, 1956 |
| 2,810,888 | George et al. | Oct. 22, 1957 |
| 2,821,686 | Burns | Jan. 28, 1958 |
| 2,856,588 | Burns | Oct. 14, 1958 |